(12) United States Patent
Ventura Garcia et al.

(10) Patent No.: US 11,781,526 B2
(45) Date of Patent: Oct. 10, 2023

(54) WIND TURBINE MAST SECTION, WIND TURBINE MAST AND ASSEMBLY METHOD

(71) Applicant: ArcelorMittal, Luxembourg (LU)

(72) Inventors: Beatriz Ventura Garcia, Liège (BE); Michaël Gremling, Seraing (BE); Emilie Dupont, Angleur (BE)

(73) Assignee: ARCELORMITTAL, Luxembourg (LU)

( * ) Notice: Subject to any disclaimer, the term of this patent is extended or adjusted under 35 U.S.C. 154(b) by 153 days.

(21) Appl. No.: 17/289,574

(22) PCT Filed: Oct. 30, 2018

(86) PCT No.: PCT/IB2018/058488
§ 371 (c)(1),
(2) Date: Apr. 28, 2021

(87) PCT Pub. No.: WO2020/089674
PCT Pub. Date: May 7, 2020

(65) Prior Publication Data
US 2022/0010778 A1    Jan. 13, 2022

(51) Int. Cl.
*F03D 13/20* (2016.01)
*E04H 12/34* (2006.01)

(52) U.S. Cl.
CPC ........... *F03D 13/20* (2016.05); *E04H 12/342* (2013.01); *F05B 2230/60* (2013.01)

(58) Field of Classification Search
CPC ..... F03D 13/20; Y02E 10/728; E04H 12/085; E04H 12/342
See application file for complete search history.

(56) References Cited

U.S. PATENT DOCUMENTS

| 10,041,269 | B2 * | 8/2018 | Gremling | ................ E04H 12/08 |
| 11,499,528 | B2 * | 11/2022 | Ventura Garcia | ....... F03D 13/20 |
| 2009/0090069 | A1 | 4/2009 | Willis | |

(Continued)

FOREIGN PATENT DOCUMENTS

| CN | 205669338 U | 11/2016 |
| EP | 2006471 A1 | 12/2008 |

OTHER PUBLICATIONS

Search Report for PCT/IB2018/058488.

*Primary Examiner* — Andrew J Triggs
(74) *Attorney, Agent, or Firm* — Davidson, Davidson & Kappel, LLC

(57) ABSTRACT

A mast section (1) including a wall includes two tubular mast elements (14) stacked and arranged edge to edge at a joining plane (P), each element (14) comprising two wall segments (16) connected by segment connectors (26) extending along the longitudinal edges of the segments (16). The mast section (1) comprises element connectors (36) each extending across and connecting the elements (14) together. The element connectors (36) are arranged either on the inner surface (12) and outer surface (13) of the wall and the segment connectors (26) are arranged on the other surface, each element connector (36) extending at least partially opposite at least one of the segment connectors (26) in a radial direction of the mast section (1) such that the wall is placed between said element connector (36) and the segment connector (26).

27 Claims, 8 Drawing Sheets

(56) References Cited

U.S. PATENT DOCUMENTS

| | | | | |
|---|---|---|---|---|
| 2010/0313497 A1* | 12/2010 | Jensen | ................... | E04H 12/08 52/651.07 |
| 2011/0283652 A1 | 11/2011 | Haridsau et al. | | |
| 2021/0115903 A1* | 4/2021 | Ventura Garcia | ..... | E04H 12/085 |
| 2021/0381492 A1* | 12/2021 | Ventura Garcia | ....... | F03D 13/20 |
| 2022/0010778 A1* | 1/2022 | Ventura Garcia | ..... | E04H 12/342 |

* cited by examiner

WIND TURBINE MAST SECTION, WIND TURBINE MAST AND ASSEMBLY METHOD

The present disclosure relates to a section of a mast for a wind turbine, a wind turbine mast comprising such a section, and a method for assembling a section of a mast for a wind turbine.

BACKGROUND

Efforts to improve the energy efficiency of wind turbines have led over time to an increase in the size of turbines, requiring masts of increased height and diameter for their support. Due to their large dimensions, such masts cannot be transported assembled. Therefore, the masts are usually transported to the installation site in sections, before being assembled in situ, a method that is also used for the assembly of the masts.

In particular, there are methods for the assembly of wind turbine masts, in which wall segments of the wind turbine are transported to the site of the wind turbine and then assembled by means of segment connectors to form substantially tubular mast elements, usually cylindrical or truncated, which are then successively assembled together by means of element connectors to form the wind turbine mast.

SUMMARY

Given the increasing size of wind turbine masts, there is a need to improve the mechanical strength of these masts so as to minimize the risk of in-service failure, specifically by buckling, while keeping manufacturing costs and assembly time to a minimum.

One object of the present disclosure is to provide a wind turbine mast, possibly of great height, with an increased service life, which can be easily and quickly transported and assembled at a lower cost.

A wind turbine mast section is provided comprising a central longitudinal axis extending in a longitudinal direction and comprising a wall having an inner and an outer surface, the mast section comprising at least two tubular mast elements stacked in the longitudinal direction and arranged edge to edge at a joining plane, each mast element comprising at least two wall segments, connected to each other by segment connectors extending along the longitudinal edges of the wall segments, the mast section further comprising element connectors, each extending across said two mast elements and connecting the mast elements together, the element connectors being arranged on one of the inner surface and the outer surface of the wall of the mast section and the segment connectors being arranged on one of the inner surface and the outer surface of the wall of the mast section, and each element connector extending at least partially opposite at least one of the segment connectors in a radial direction of the mast section such that the wall is at least partially placed between said element connector and the opposite segment connector.

According to particular embodiments, the mast section comprises one or more of the following features, considered alone or according to all technically possible combinations:

the element connectors are arranged on the outer surface of the mast section and the segment connectors are arranged on the inner surface of the mast section;

each element connector extends partially opposite at least two segment connectors that are adjacent in the longitudinal direction, one of these two segment connectors being arranged above the joining plane between the two mast elements and the other of these two segment connectors being arranged below this joining plane;

each element connector extends opposite a corresponding segment connector for an overlap height of not more than 20% of the height of the mast element on which the segment connector is located;

each element connector extends radially opposite a corresponding segment connector in an overlap area extending over a single mast element;

each segment connector and/or each element connector is in the form of a flat plate;

for at least one mast element, the mast element comprises, at each junction between two circumferentially adjacent wall segments, at least two segment connectors adjacent in the longitudinal direction;

each segment connector has a constant width along the height of the mast section;

each segment connector has a first part, extending radially opposite a corresponding element connector, and a second part, which does not extend radially opposite an element connector, the width of the first part being strictly greater than the width of the second part;

each segment connector extends up to the junction plane between adjacent mast elements;

each segment connector extends at a distance from the junction plane between adjacent mast elements;

the mast section further comprises reinforcements, each reinforcement being arranged on the same surface of the mast section as the segment connectors, and extends across two adjacent mast elements, each element connector being arranged, in the radial direction, opposite a reinforcement;

each reinforcement is elongated in a direction perpendicular to the longitudinal direction;

each reinforcement extends in the longitudinal extension of a segment connector;

each reinforcement overlaps at least one segment connector, and, in particular, whereby each reinforcement extends across two longitudinally adjacent segment connectors;

each reinforcement has a width greater than or equal to the width of the segment connector;

each wall segment comprises at least one center panel and two side panels forming an angle with the or each center panel, the side panels comprising the longitudinal edges of the wall segment;

the mast section further comprises intermediate connectors, arranged to extend across two adjacent mast elements, between two circumferentially adjacent element connectors, said intermediate connectors being arranged on the same one of the inner and outer surfaces of the mast section as the element connectors;

each intermediate connector extends across two longitudinally adjacent center panels of the two mast elements and each segment connector extends across two circumferentially adjacent side panels of at least one of the two adjacent mast elements;

the longitudinal edges of one wall segment of the upper mast element are located in the extension of the longitudinal edges of the adjacent wall segment in the longitudinal direction of the lower mast element;

each segment connector extends across two circumferentially adjacent side panels of the two adjacent mast elements;

the adjacent mast elements are angularly offset with respect to each other;

each element connector extends across two circumferentially adjacent side panels of one of the mast elements and across a center panel of the other mast element;

the mast section has a tubular shape of polygonal cross-section, each side of this polygon defining a facet of the mast section.

A wind turbine mast is also provided comprising a mast section as described above.

A method for assembling a mast section as previously described is also provided, comprising:

providing wall segments and assembling these wall segments together by means of segment connectors so as to form mast elements;

stacking two mast elements, in the longitudinal direction, and connecting these two mast elements to each other by means of element connectors.

BRIEF DESCRIPTION OF THE DRAWINGS

The present disclosure will be better understood upon reading the following description, given only as an example, and made with reference to the appended drawings, in which.

DETAILED DESCRIPTION

Throughout the description, "connection" is understood as the mechanical attachment by a connecting element, and in particular to attachment by bolting or screwing. This term thus does not include welding or brazing connections, for example.

The use of bolts or screws to make the connections enables optimal management of the fatigue behavior of the mast section by choosing the location and density of the bolts or screws according to strength and fatigue endurance requirements. In addition, the absence of welds within the mast section and the wind turbine mast avoids the presence of heat-affected zones, which guarantees a homogeneous performance of the steel and eliminates the weak points generated by these heat-affected zones.

"Height" is understood as the dimension of an element in the longitudinal direction and "width" is understood as the dimension of the element perpendicular to the longitudinal direction.

Throughout the description, the "longitudinal edges" of an element is understood as the edges of the element extending in the longitudinal direction. "Transverse edges" is understood as the edges of the element extending perpendicularly to the longitudinal direction.

The terms "top" and "bottom", "below" and "above" and "lower" and "upper" are used in relation to the normal orientation of the wind turbine mast 2 at its implantation site.

Throughout the description, "angular offset" is understood as the rotation of a component part of the mast along the center longitudinal axis L relative to an adjacent part.

Throughout the description, the various components of the mast, the mast section and the mast elements are preferably made of metal, especially steel, especially steel coils or plates.

The mast section 1 for a wind turbine according to the present disclosure is intended to form part of a mast 2 of a wind turbine 3.

Figure 1:
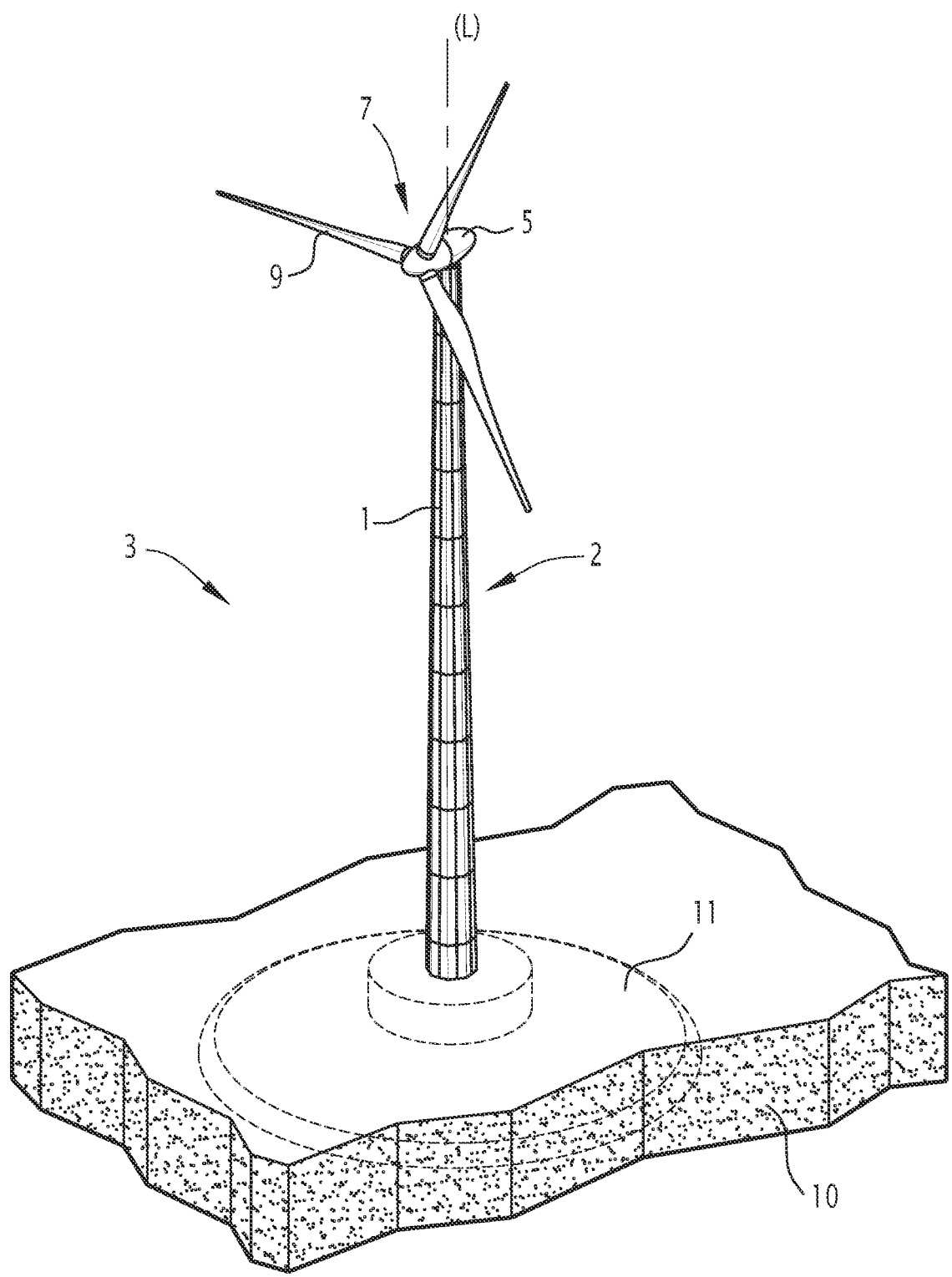
FIG. 1 is a schematic perspective view of a wind turbine.

Classically, and as shown in FIG. 1, the wind turbine 3 comprises, at its upper end, a nacelle 5 and a rotor 7 mounted on nacelle 5. The nacelle 5, mounted at the upper end of the mast 2, houses mechanical, electrical and electronic components for the operation of the wind turbine 3. The rotor 7 comprises a plurality of blades 9 designed to be rotated around an axis of the rotor 7 by the wind energy. At its lower end, the wind turbine mast 2 is intended to be anchored in the ground 10 of the installation site, by any means known to the person skilled in the art, in particular by suitable foundations 11.

The mast section 1 according to the present disclosure has a tubular shape with a center longitudinal axis L extending in a longitudinal direction. When the mast section 1 is installed on its installation site, the longitudinal direction extends along the vertical of the installation site.

In the examples shown in the figures, the mast section 1 has a truncated cone shape, tapering towards the top of the mast 2.

A "cone" is understood as any regulated surface defined by a generatrix passing through an apex and a variable point describing a guiding curve.

As an example, the mast section 1 has an external diameter in the range of 7 to 11 meters, for example, equal to 9 meters, at its lower end, and in the range of 2 to 4 meters, for example, equal to 4 meters, at its upper end. These diameters can be adapted, however, according to resistance requirements, connection to the basket or the facility site.

The mast section 1 comprises a wall comprising an inner surface 12 and an outer surface 13. The inner surface 12 of the mast section 1 faces the inside of mast section 1. The outer surface 13 of mast section 1 faces the outside of mast section 1.

The section 1 preferably has a polygonal cross section. Each side of this polygon defines one facet of the wall of the mast section 1.

A polygonal truncated cone shape has the advantage of being as close as possible to the truncated cone shape with a circular base, which is the shape with the best resistance to wind in all wind directions and the best inertia, while being very simple to manufacture, since it can be made from wall segments obtained by simple bending or profiling of metal sheets, for example.

According to a variant, the mast section 1 has a cylindrical shape with a polygonal base of constant cross-section.

Figure 2:
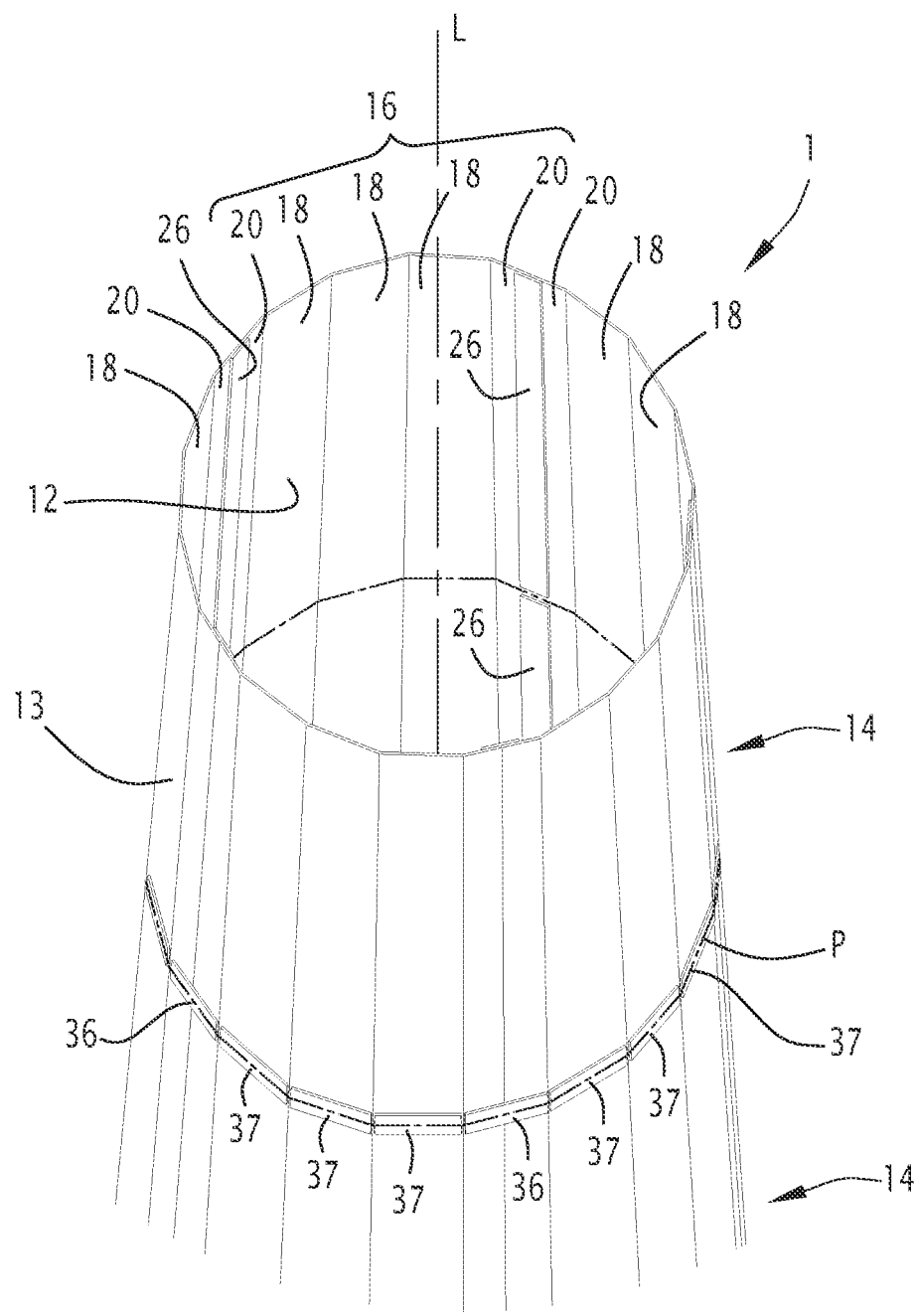
FIG. 2 is a schematic perspective view of part of a wind turbine mast section.

As shown in FIG. 2, the mast section 1 consists of at least two mast elements 14, stacked in the longitudinal direction. The adjacent mast elements 14 of the mast section 1 are arranged edge to edge along a joining plane P with the necessary clearances for the assembly.

Each mast element 14 has a tubular shape with a center longitudinal axis that coincides with the center longitudinal axis L of the mast section 1 and has a general shape similar to that of the mast section 1.

In the examples shown, the mast element 14 has a truncated cone shape, preferably with a polygonal base, tapering towards the top of the mast element 14.

When the mast section 1 has a cylindrical shape with a polygonal base, the mast element 14 also has a cylindrical shape with a polygonal base.

Each mast element 14 comprises a plurality of wall segments 16 connected to each other by their longitudinal edges. The adjacent wall segments 16 of a mast element 14 are arranged edge to edge along a joining line with the necessary clearances for assembly.

The fact that the mast elements 14 are formed from a plurality of wall segments 16 connected to each other avoids being limited by transportation with regard to the final diameter of the mast element 14. This is because the wall segments 16 are relatively space-saving and can therefore be transported by standard trucks. They can then be assembled directly at the site to produce mast elements 14 with the desired diameter.

In addition, the design based on the assembly of small elements makes it possible to transport them by compact and light vehicles, which makes it possible to consider new locations that were previously unthinkable because they were difficult to transport by heavy goods vehicles such as so-called exceptional transport.

As an example, the thickness of the wall segments 16 varies according to their position along the mast 2, decreasing from the base to the top of the mast 2. For example, the wall segment 16 is 30 mm thick at the base of the mast 2 and 16 mm thick at the top of the mast 2.

Figure 3:
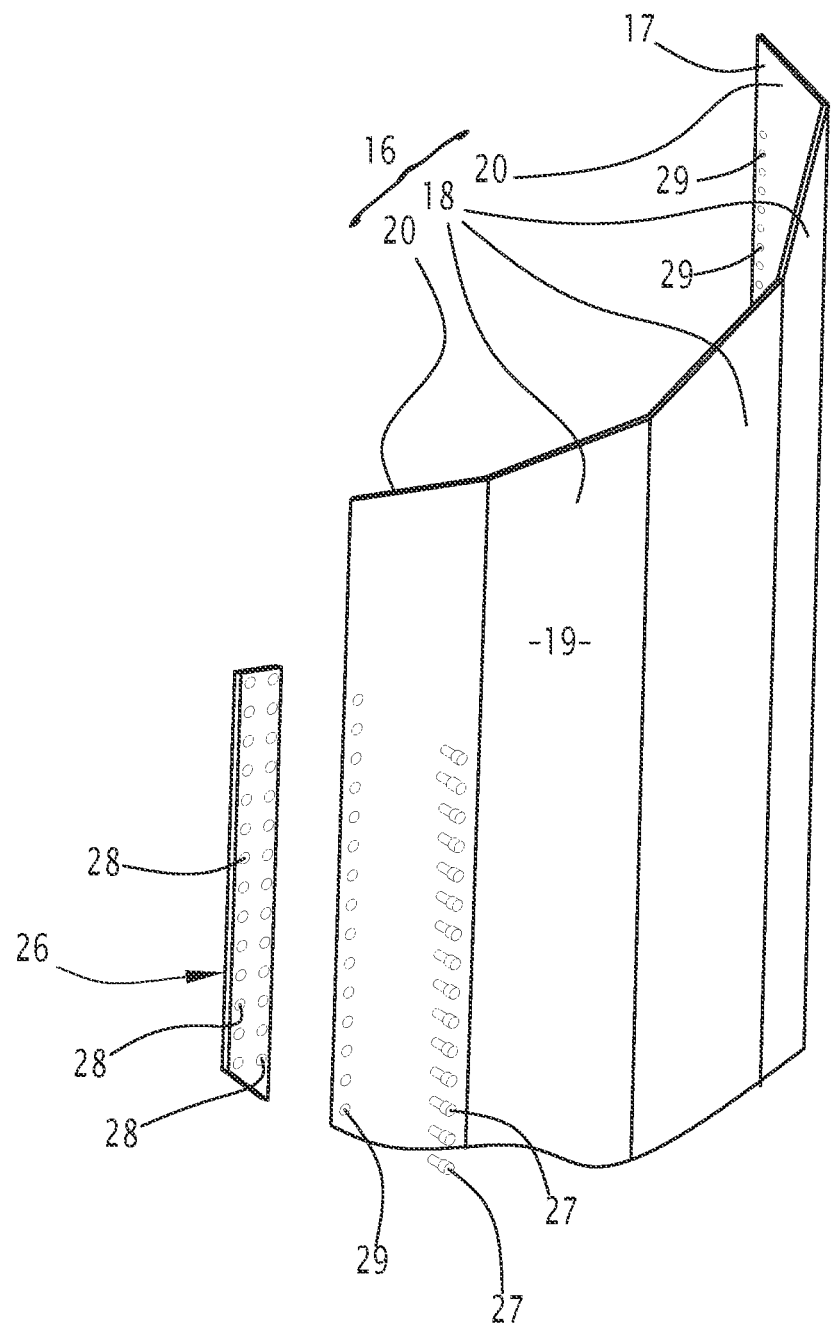
FIG. 3 is a schematic exploded perspective view of part of the mast section in FIG. 2.

As shown in FIG. 3, each wall segment 16 has an inner face 17, facing inward of the mast section 1 and an outer face 19, facing outward of the mast section 1. The inner surface 12 of the mast section 1 is formed by joining the inner faces 17 of each of the wall segments 16 of the mast section 1. The outer surface 13 of the mast section 1 is formed by joining the outer faces 18 of each of the wall segments 16 of the mast section 1.

In the example shown in FIGS. 2 and 3, each wall segment 16 comprises at least one center panel 18 and two side panels 20. The side panels 20 extend on either side of the center panel 18 along the circumference of the mast element 14. They laterally frame the center panel 18. The side panels 20 include the longitudinal edges of the wall segment 16. They each form an angle with the or each center panel 18.

This type of wall segment 16 has the advantage that it is easily obtained by simply folding a metal sheet. The side panels 20 stiffen the wall segment 16 and increase the resistance of the wall segment 16 to bending in the longitudinal direction.

In the example shown, for the mast element 14 shown, each wall segment 16 has several center panels 18, which are adjacent along the circumference of the mast element 14. This set of adjacent center panels 18 is framed by the two side panels 20. Specifically, in this example, for the mast element 14 shown, each wall segment 16 comprises three center panels 18 and two side panels 20.

According to one embodiment, the wall segments 16 of a given mast element 14 have a number of center panels 18, depending on the position of the mast element in the longitudinal direction. As an example, the number of center panels 18 per wall segment 16 increases from bottom to top along the mast section 1.

The joining of adjacent side panels 20 of two adjacent wall segments 16 of a mast element 14 forms a facet of the mast element 14. Each center panel 18 of a wall segment 16 also forms a facet of mast element 14.

Each facet of the related mast section 1 then corresponds to the joining of the longitudinally adjacent facets of the stacked mast elements 14.

The wall segments 16 are connected to each other by segment connectors 26 extending along the longitudinal edges of the wall segments 16.

The segment connectors 26 are attached to the wall segments 16.

Each segment connector 26 extends across two circumferentially adjacent wall segments 16 of a mast element 14 and is attached to the adjacent side panels 20 of the two adjacent wall segments 16 of the mast element 14.

The segment connectors 26 are shown more specifically in FIGS. 2, 3, 5 and 6.

In the example shown in FIGS. 1 to 6, the segment connectors 26 are arranged on the inner surface 12 of the mast section 1. In this example, each segment connector 26 rests on the inner surface 12 of the mast section 1, and, more specifically, on the inner faces 17 of the two wall segments 16 connected to each other by the segment connector 26.

As shown schematically in FIG. 3, each segment connector 26 is attached to the corresponding wall segments 16 by means of first connection elements 27, such as screws or bolts. For this purpose, the segment connectors 26 have connection holes 28 intended to receive the first connection elements 27. These connection holes 28 are arranged in the form of a network comprising lines extending perpendicular to the longitudinal direction and rows extending parallel to the longitudinal direction.

The wall segments 16 also include connection holes 29 organized in a network coinciding with that of connection ports 28 of the segment connectors 26.

For reasons of simplification of the drawings, the first connection elements 27 and the connection holes 28, 29 are shown only in some of the figures.

Preferably, the segment connectors 26 are flat. They are advantageously produced by simple cutting from sheet steel.

In the embodiment shown in FIGS. 1 to 6, the width of the segment connectors 26 is constant over their entire height. In this example, each segment connector 26 has an elongated rectangular shape in the longitudinal direction.

In this embodiment, the width of the segment connector 26 is less than or equal to 40% of the width of the facet of the mast element 14 formed by connecting the side panels 20 of the two wall segments 16 of the mast element 14 by means of the segment connector 26. In particular, it is less than or equal to 30% of this width. This width can be adapted for each segment connector 26 of the mast section 1 according to the forces that the segment connector 26 will have to withstand.

Preferably, for economic and logistical reasons on site, all segment connectors 26 of the mast section 1 have the same dimensions.

According to one embodiment, each mast element 14 comprises a single segment connector 26 at each junction between two circumferentially adjacent wall segments 16.

As a variant, each mast element 14 comprises, at each junction between two circumferentially adjacent wall segments 16, at least two segment connectors 26 adjacent in the longitudinal direction.

The choice of the number of segment connectors 26 per mast element 14 depends on the height of the mast elements 14. The number of segment connectors 26 per mast element 14 increases in particular with the height of the mast element 14.

The mast section 1 also includes means for connecting two adjacent mast elements 14 to each other in the longitudinal direction.

These connecting means comprise element connectors 36, each extending across two adjacent mast elements 14 in the longitudinal direction.

Each element connector 36 extends, in the extension, in the longitudinal direction, by at least one segment connector 26.

Figure 5:
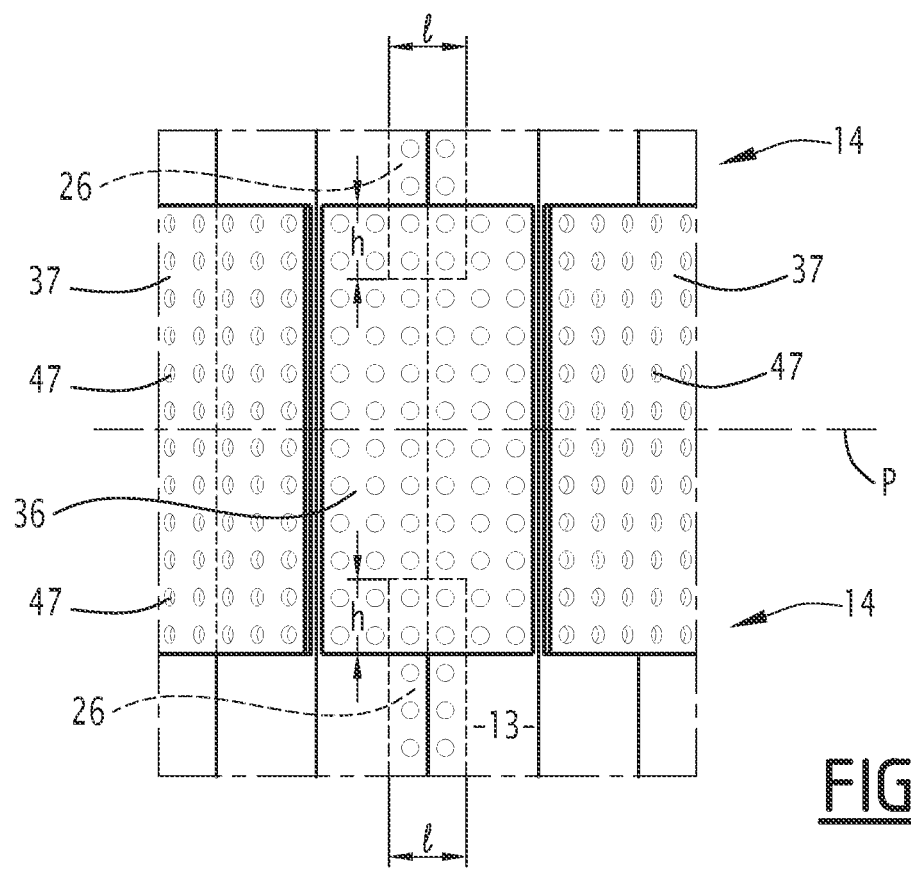
FIG. 5 is an enlarged schematic view of a junction area between two mast elements of a mast section in FIG. 2, seen from outside the mast, showing an element connector and, in dotted lines, segment connectors arranged inside the mast section, partly opposite the element connector.
Figure 6:
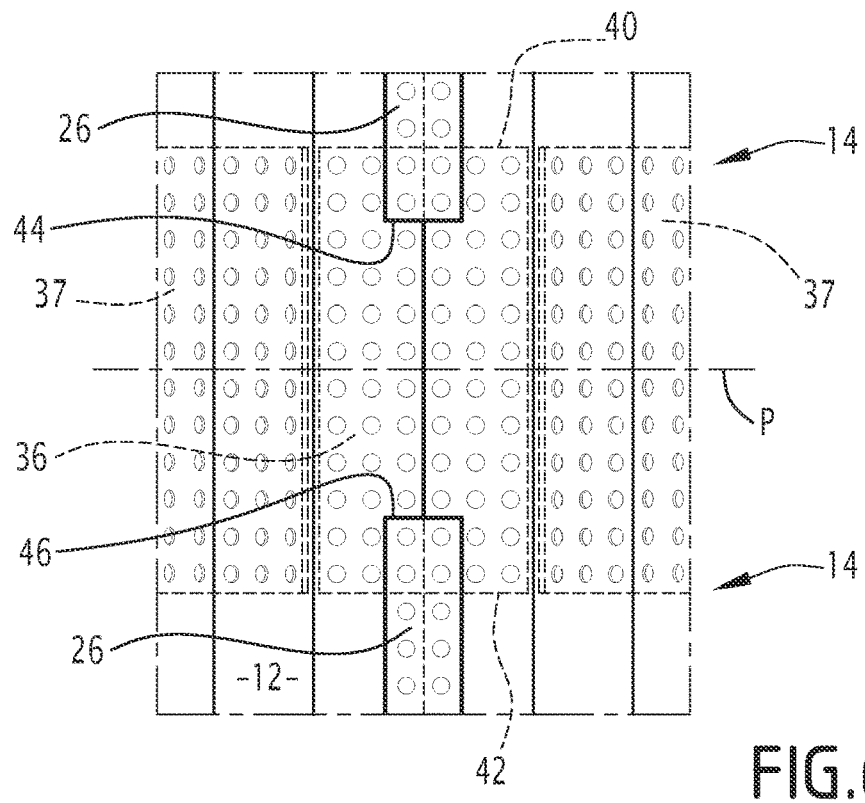
FIG. 6 is a view similar to FIG. 5, as seen from inside the mast, showing segment connectors arranged inside the mast and, in dotted lines, a segment connector arranged outside the mast section, partly opposite the segment connectors.

According to the present disclosure, and as shown in particular in FIGS. 2, 5 and 6, the element connectors 36 are arranged on an opposite surface of the mast section 1 with respect to the segment connectors 26. In the example shown in the figures, the segment connectors 26 are arranged on the inner surface 12 of the mast section 1, while the element connectors 36 are arranged on the outer surface 13 of the mast section 1.

Each segment connector 36 is supported on the outer surface 13 of the mast section 1.

Preferably, the element connectors 36 are planar. They are advantageously produced by simple cutting from sheet steel.

In the embodiment shown, the width of the element connectors 36, taken perpendicularly to the longitudinal direction, is constant over the entire height of the element connectors 36, taken in the longitudinal direction.

In the examples shown, each element connector 36 has an elongated rectangular shape in a direction perpendicular to the longitudinal direction.

In the case of a the mast section 1 with facets, each element connector 36 extends over one facet of the mast section 1, extending across the longitudinally adjacent facets of the mast elements 14 connected to each other by this element connector 36.

The element connectors 36 have a width less than or equal to the width of the wall facet of the mast section 1 to which they are attached, taken at the junction plane P between these two mast elements 14. Advantageously, the element connectors 36 have a width greater than or equal to 70% of the width of this wall facet, and more particularly greater than or equal to 85% of this width. In the embodiment shown in the figures, the width of the element connectors 36 is approximately equal to the width of the wall facet of the mast section 1 to which they are attached.

In the example shown in the figures, the element connectors 36 are symmetrical with respect to the junction plane P between the mast elements 14 which they overlap.

The element connectors 36 are fastened to the mast elements 14 by means of second connection elements, for example by screws or bolts.

Figure 4:
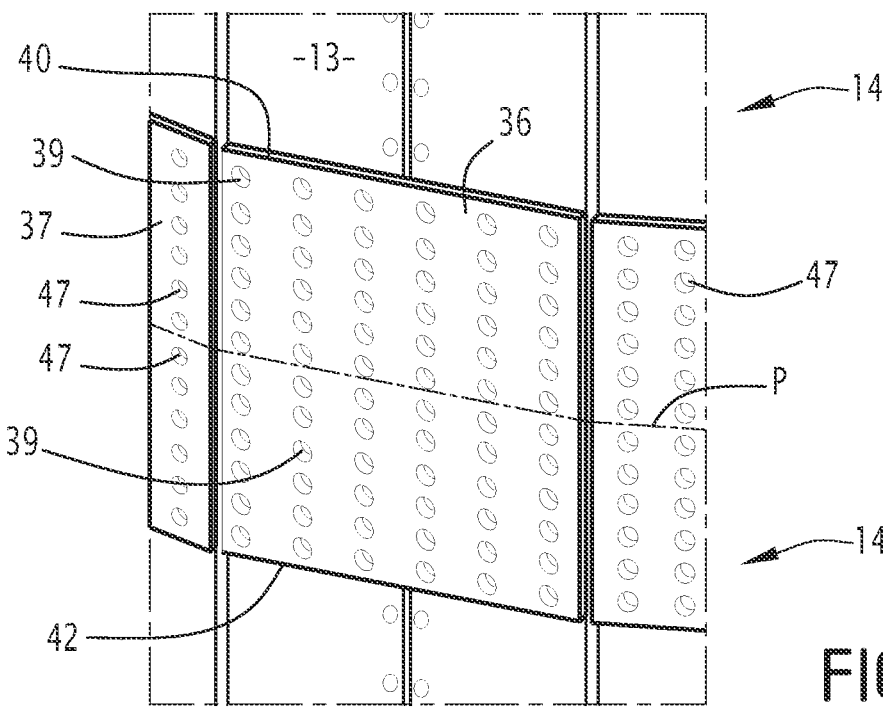
FIG. 4 is an enlarged schematic view of a junction area between two mast elements of the mast section in FIG. 2, seen from outside the mast.

As an example, and as shown in FIG. 4, each element connector 36 comprises a regular network of connection holes 39 for receiving the second connecting elements, which array consists of lines, extending perpendicularly to the longitudinal direction and rows, extending parallel to the longitudinal direction. This network is for example a rectangular mesh network, and for example a square mesh network. The connection holes 39 are evenly distributed over the entire surface of the element connectors 36.

The distance between adjacent connection holes 39 is chosen so as to optimize the mechanical strength and fatigue endurance according to the needs and geometrical criteria established by the standards in force.

The mast segments 16 include a network of connection holes coinciding with the network of connection holes 39 of the element connectors 36.

Within the segment connectors 26 and/or element connectors 36, the distances between the rows of connection holes 28, 39, formed perpendicular to the longitudinal direction and/or between the rows of connection holes 28, 39, formed parallel to the longitudinal direction, are chosen so as to optimize the number of bolts required according to the mechanical stresses.

For example, the distance between the rows of connection holes 28 of the segment connectors 26 is different from the distance between the rows of the connection holes 39 of the element connectors 36.

In the embodiment shown in FIGS. 1 to 6, the distances between the rows of connection holes 28, formed parallel to the longitudinal direction, of the segment connectors 26 and between the rows of connection holes 39, formed parallel to the longitudinal direction, of the element connectors 36 are identical so that within the mast section 1, the rows of connection holes 28 extend in the longitudinal direction as an extension of the rows of connection holes 39.

For reasons of simplification of the drawings, the second connecting elements and the connecting holes are shown only in some of the figures.

In the embodiment shown in FIGS. 1 to 6, the longitudinal edges of one wall segment 16 of the upper mast element 14 lie in the extension of the longitudinal edges of the adjacent wall segment 16 in the longitudinal direction of the lower mast element 14. For example, the side panels 20 of the upper the mast element 14 are in the longitudinal extension of the side panels 20 of the lower the mast element 14 and the center panels 18 of the upper the mast element 14 are in the longitudinal extension of the center panels 18 of the lower the mast element 14. In this example, each element connector 36 extends across the side panels 20 of the four adjacent wall segments 16.

According to the present disclosure, and as more particularly illustrated in FIGS. 5 and 6, each element connector 36 extends at least partially opposite a segment connector 26 in a radial direction of the mast section 1 such that the wall is at least partially placed between that element connector 36 and the opposite segment connector 26.

"Radial direction" is understood as a direction passing through the longitudinal center axis L of the mast section 1 and extending in a plane normal to this longitudinal center axis L.

There is thus an overlap area between the element connector 36 and the segment connector 26.

Thus, at each junction between two mast elements 14, the overlapping of the mast element connector 36, the wall of mast element 14 and the segment connector 26 in the radial direction results in a triple wall thickness. This triple wall thickness results in a mechanical reinforcement of the junction between the mast elements 14 and thus in a good mechanical strength of the mast section 1.

In particular, the segment connector 26 extends opposite the element connector 36 over only part of the height of the segment connector 26. Thus, it extends beyond the element connector 36 in the longitudinal direction.

In the example shown, only part of the element connector 36 extends opposite a segment connector 26. In particular, the element connector 36 extends beyond the segment connector 26 in the longitudinal direction and/or in the circumferential direction.

As an example, each element connector 36 extends opposite a corresponding segment connector 26 by an overlap height h, shown in FIG. 5, which is at most 20% of the height of the mast element 14 on which the segment connector 26 is arranged.

Preferably, each element connector 36 extends opposite a corresponding segment connector 26 for an overlap height h such that the element connector 36 includes at least one line of connection holes 39 coinciding with a line of connection holes 28 of the segment connector 26. Specifically, in the example shown in FIGS. 5 and 6, each element connector 36 extends opposite a corresponding segment connector 26 by an overlap height such that the element connector 36 has at least two, and for example exactly two, lines of connection holes 39 coinciding with corresponding lines of connection holes 28 of the segment connector 26.

As an example, each element connector 36 extends opposite a corresponding segment connector 26 for an overlap height h equal to at most 50% of the height of the element connector 36.

As an example, each segment connector 26 extends opposite a corresponding segment connector 36 for an overlap height h equal to no more than 20% of the height of the segment connector 26.

In the example shown, each element connector 36 extends opposite a corresponding segment 26 connector for an overlap width 1 equal to the width of the segment 26 connector. In other words, the element connector 36 extends across the entire width of the segment connector 26 opposite the segment connector 26.

In this example, the width of element connector 36 is greater than the width of segment connector 26.

Each element connector 36 extends past a corresponding segment connector 26 in an overlap area extending over a single mast element 14. This is because each segment connector 26 extends on only one side, in the longitudinal direction, of the junction plane P between longitudinally adjacent mast elements 14.

In the example shown in FIGS. 1 to 6, each element connector 36 extends opposite two segment connectors 26 aligned in the longitudinal direction.

One of these two segment connectors 26, hereinafter referred to as the upper segment connector 26, connects wall segments 16 of the upper mast element 14 to each other from among the two mast elements 14 connected to each other by the element connector 36, while the other segment connector 26, hereinafter referred to as the lower segment connector 26, connects wall segments 16 of the lower mast element 14 to each other from among the two mast elements 14 connected to each other by the element connector 36.

The upper segment connector 26 is arranged above the junction plane P between the mast elements 14 connected to each other by the element connector 36, while the lower segment connector 26 is arranged below the junction plane P.

Advantageously, the upper segment connector 26 and the lower segment connector 26 are symmetrical with respect to the junction plane P between the two mast elements 14 connected by the element connector 36.

Therefore, the overlap height h, respectively the overlap width 1, between the element connector 36 and the lower segment connector 26 is identical to the overlap height h, respectively the overlap width 1, between the element connector 36 and the upper segment connector 26.

Advantageously, the two segment connectors 26 extend opposite the element connector 36 over only part of their height. Thus, the upper segment connector 26 extends, in the longitudinal direction, partly below an upper edge 40 of the element connector 36, while the lower segment connector 26 extends, in the longitudinal direction, partly above a lower edge 42 of the element connector 36.

In the example shown, each segment connector 26 extends away from the junction plane P between the mast elements 14.

In this example, the upper segment connector 26 extends away, in the longitudinal direction, from the lower segment connector 26. Thus, there is a gap between a lower edge 44 of the upper segment connector 26 and an upper edge 46 of the lower segment connector 26. In this example, the upper and lower segment connectors 26 do not extend edge to edge.

As an option, the means of connecting the mast elements 14 to each other also include intermediate connectors 37, shown in particular in FIGS. 2 and 4.

The intermediate connectors 37 connect the mast elements 14 to each other at the center panels 18 of their wall segments 16. They extend across the two adjacent mast elements 14 by being attached to the center panels 18 of the wall segments 16 of these mast elements 14. They are arranged between two circumferentially adjacent element connectors 36. They extend along the transverse edges of the mast elements 14.

The intermediate connectors 37 are preferably arranged on the same surface of the mast section 1 as the element connectors 36. Thus, in the example shown in FIGS. 1 to 6, the intermediate connectors 37 are arranged on the outer surface 13 of the mast section 1, and in particular on the outer surface 19 of the longitudinally adjacent mast segments 16 connected to each other by the intermediate connector 37.

Preferably, intermediate connectors 37 are substantially planar. In the example shown, they have a rectangular outline. They extend in a direction of elongation perpendicular to the longitudinal direction.

The intermediate connector 37 has a width less than or equal to the width of the facet of the mast section 1 to which it is attached, taken at the junction plane P between these mast elements 14. This facet is formed by joining the center panels 20 of the two longitudinally adjacent wall segments 16. As an example, the intermediate connectors 37 have a width greater than or equal to 50% of the width of this facet, taken at the level of the junction plane P between these mast elements 14, and in particular a width approximately equal to the width of this facet.

The intermediate connectors 37 contribute to the rigidity along the mast 2, and more particularly between two adjacent mast elements 14.

The intermediate connectors 37 are attached to the wall segments 16 by means of third connection elements such as screws or bolts. Each intermediate connector 37 has a regular network of connection holes 47 for the third connection elements. This network is, for example, a rectangular mesh network, and for example a square mesh network. The connection holes 47 are distributed evenly over the entire surface of the intermediate connectors 37. The distance between adjacent connection holes 47 is chosen so as to optimize the mechanical strength and fatigue endurance as required.

When the mast section 1 includes intermediate connectors 37, the wall segments 16 include a network of connection ports coinciding with the network of connection ports of intermediate connectors 37.

For the sake of simplifying the drawings, the third connecting elements have not been shown in the figures.

The present disclosure also relates to a method for assembling a the mast section 1 as described above.

This assembly method comprises:

providing wall segments 16 and assembling these wall segments 16 to each other via segment connectors 26 so as to form mast elements 14; and the stacking, in the longitudinal direction, of two mast elements 14 and the connection of these two mast elements 14 to each other by means of element connectors 36.

According to the present disclosure, the element connectors 36 are arranged on a surface of the mast section 1 opposite to the surface on which the segment connectors 26 are arranged. Thus, the element connectors 36 and the segment connectors 26 are arranged on either side of the wall segments 16 in the radial direction.

Preferably, the segment connectors 26 and/or the element connectors 36 are pre-assembled on wall segments 16 prior to the assembly of the wall segments 16 to each other to form the mast elements 14, in particular they are pre-assembled to the wall segments 16 at the manufacturing site of the wall segments 16 prior to transporting the wall segments 16 to the assembly site of the mast section 1.

In particular, the segment connectors 26 are pre-assembled on one side of the wall segment 16 and the element connectors 36 are pre-assembled on the opposite side of wall segment 16. For example, the segment connectors 26 are pre-assembled on the inner side 17 of the wall segment 16 and the element connectors 36 are pre-assembled on the outer side 18 of the wall segment 16.

Optionally, in the stacking step, the two mast elements 14 are additionally connected by means of intermediate connectors 37, these intermediate connectors 37 preferably being arranged extending across two longitudinally adjacent center panels 18 of the wall segments 16 of the two mast elements 14.

Preferably, the intermediate connectors 37 are pre-assembled on wall segments 16 prior to the assembly of the wall segments 16 to each other to form the mast elements 14. In particular, they are pre-assembled to the wall segments 16 at the manufacturing site of the wall segments 16 prior to transporting the wall segments 16 to the assembly site of the mast element 1. For example, the intermediate connectors 37 are pre-assembled on the same side of the wall segment 16 as the element connectors 36.

For example, each wall segment 16 includes at least one segment connector 26 pre-assembled at one of its longitudinal edges and/or at least one element connector 36, pre-assembled at one of the bottom and top edges of wall segment 16, preferably at the top edge of the wall segment 16. Optionally, each wall segment 16 also includes at least one intermediate connector 37, pre-assembled to the same edge of wall segment 16 as the element connector 36.

If the element connectors are pre-assembled on the wall segments 16, as described above, the connection of the mast elements to each other can be carried out from the inside of the mast section 1, which is advantageous from a safety point of view.

The present disclosure also relates to a wind turbine mast 2 comprising at least one the mast section 1 as described above. Advantageously, the wind turbine mast 2 is formed by stacking such mast sections 1, in the longitudinal direction.

The mast section 1 according to the present disclosure is advantageous. In effect, this mast section 1 has great bending strength due to the provision of overlap areas at the junction of the mast elements 14, in which an element connector 36 is arranged opposite at least one segment connector 26. This is because in each overlap area, the overlap of the element connector 36, the wall of the mast element 14 and the segment connector 26 results in a triple wall thickness. This good mechanical strength increases the service life of the wind turbine mast section 1, and thus of the wind turbine 3 according to the present disclosure. In addition, the alternating connectors between the two sides of the mast section help reduce the stresses due to the effects of eccentricities which are manifested through additional and localized contributions from the bending moment, especially in the region between the segment connectors 26 and the element connectors 36.

Further, the mast section 1 according to the present disclosure is simple and inexpensive to assemble.

FIGS. 7 to 12 show the mast section 1 according to variants.

The mast sections 1 illustrated in FIGS. 7 and 8 differ from the mast section 1 described in FIGS. 1 to 6 only by the features mentioned below.

Figure 7:
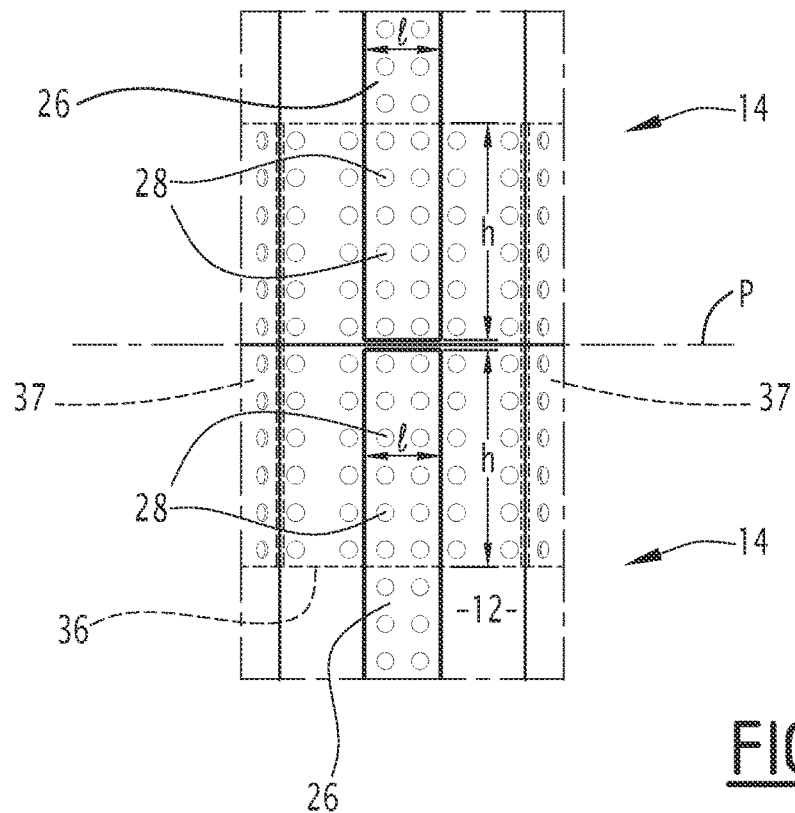
FIG. 7 is a view similar to FIG. 6 of a variant mast section.

In the variant shown in FIG. 7, each segment connector 26 extends up to the junction plane P between the adjacent mast elements 14.

In this variant, the two segment connectors 26 that are longitudinally adjacent on either side of the junction plane P, that is, the upper and lower segment connector 26, extend edge to edge.

In this variant, each segment connector 36 extends opposite a corresponding segment connector 26 for an overlap height h equal to half the height of the segment connector 36.

In particular, the overlap height h is such that all lines of the connection holes 39 of the element connector 36 on one side of the joining plane P coincide with corresponding lines of connection holes 28 of the segment connector 26.

Figure 8:
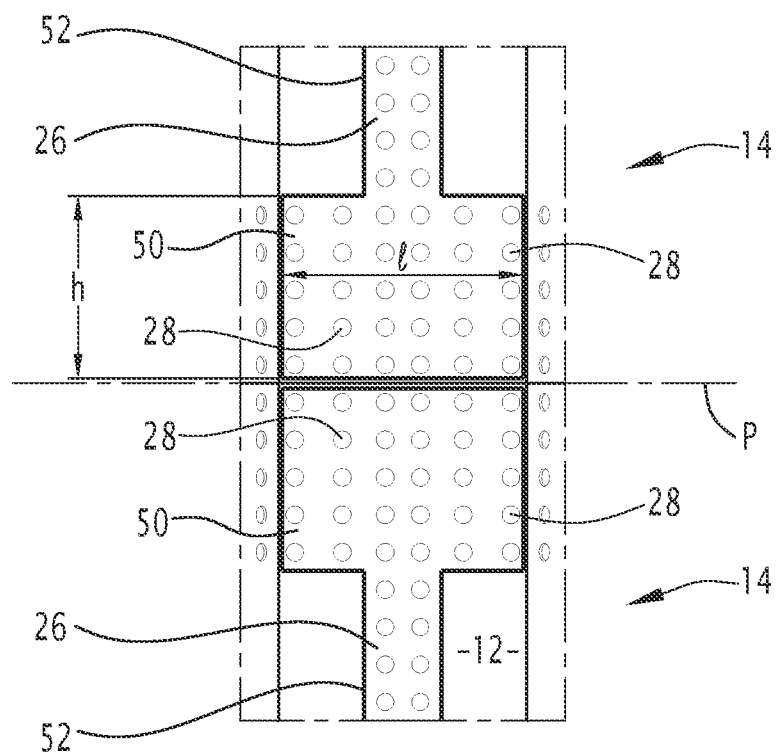
FIGS. 8 to 12 are enlarged schematic views of a junction area between two mast elements of a mast section, viewed from the inside of the mast, showing segment connectors arranged inside the mast.

In the variant shown in FIG. 8, the segment connectors 26 have a variable width depending on the height of the mast section 1.

More particularly, in this embodiment, the segment connectors 26 have a first part 50, which extends radially opposite a corresponding element connector 36, and a second part 52, which does not extend radially opposite an element connector 36.

As an example, each of the parts 50, 52 has a constant width.

In this variant, the width of the first part 50 is strictly greater than the width of the second part 52. Thus, the segment connector 26 is reinforced in its overlap area with the element connector 36.

The width of the first part 50 is, for example, at least twice the width of the second part 39, and in particular at least three times the width of the second part 52.

In the example shown in FIG. 8, the width of the first part 50 is approximately equal to the width of the facet of the mast element 14 formed by connecting the side panels 20 of the two wall segments 16 of the mast element 14 by means of said segment connector 26.

For example, the width of the second part 52 is less than or equal to 40% of the width of the facet of the mast element 14 formed by connecting the side panels 20 of the two wall segments 16 of the mast element 14 by means of said segment connector 26. In particular, it is less than or equal to 30% of this width. This width can be adapted for each segment connector 26 of the mast section 1 according to the forces that the segment connector 26 will have to withstand.

Thanks to the provision of reinforced segment connectors 26 in their overlap area with the segment connectors 36, the mast section 1 in this variant provides an excellent compromise between mechanical strength and weight of the structure, with the segment connector 26 being reinforced in the areas in which the mechanical stresses are greatest.

The method for assembling the mast sections 1 according to the variants in FIGS. 7 and 8 is identical to that described in FIGS. 1 to 6.

Figure 9:
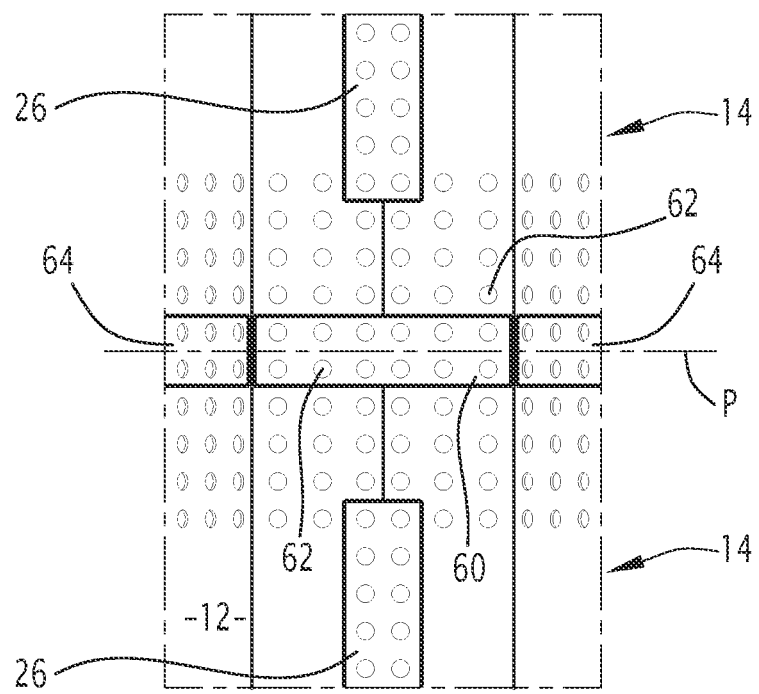
Figure 10:
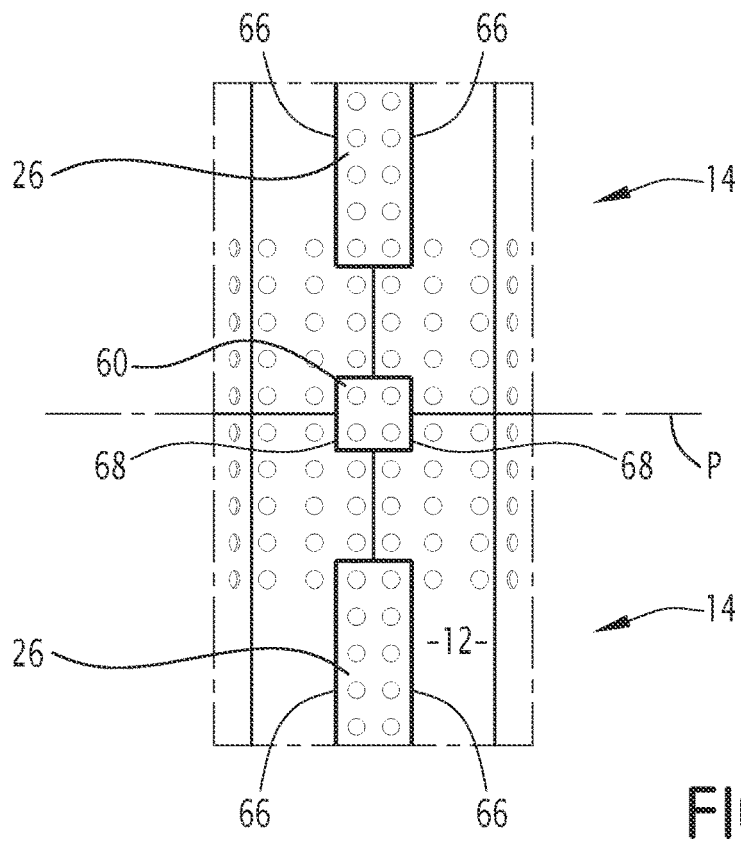

The mast sections 1 in the variants shown in FIGS. 9 and 10 differ from the mast sections 1 described in FIGS. 1 to 6 only in that they additionally include reinforcements 60.

The reinforcements are arranged on the same surface of the mast section 1 as the segment connectors 26, extending across two adjacent mast elements 14.

Each element connector 36 is arranged radially opposite a reinforcement 60. In particular, each reinforcement 60 extends opposite an element connector 36 over its entire surface.

Each reinforcement 60 is supported on the corresponding surface of the mast section 1, that is, in the example shown, on the inner surface 12 of the mast section 1.

In the example shown, the reinforcement 60 is planar. It is advantageously made by simply cutting from a steel sheet.

In the embodiment shown, the width of the reinforcement 60 is constant over its entire height.

In the examples shown, each reinforcement 60 has a rectangular shape that is elongated in a direction perpendicular to the longitudinal direction.

In the case of a faceted mast section 1, each reinforcement 60 extends over one facet of the mast section 1, extending across the longitudinally adjacent facets of the mast elements 14 connected to each other by an element connector 36.

Each reinforcement 60 extends in the longitudinal extension by at least one segment connector 26.

In the example shown, the reinforcements 60 are symmetrical with respect to the junction plane P between the overlapping mast elements 14.

Preferably, all reinforcements 60 are identical.

As an example, each reinforcement 60 has a regular network of connection holes 62 for the connection of the reinforcement 60 to the mast elements 14. The network of connection holes 62 coincides with the network of connection holes 39 of the element connectors 36.

The connecting elements of the reinforcement 60 are preferably combined with the second connecting elements, which attach the element connectors 36 to the mast elements 14, with these second connecting elements passing through the coinciding connection holes 39 and 62.

In the variants shown in FIGS. 9 and 10, each reinforcement 60 has, on each side of the junction plane P, at least one line of connection holes 62 coinciding with a line of connection holes 39 of the corresponding element connector 36. Specifically, in the case of the variant shown in FIGS. 9 and 10, each reinforcement 60 includes, on each side of the joining plane P, a single line of connection holes 62 coinciding with a line of connection holes 39 of the corresponding element connector 36.

In the variants shown in FIGS. 9 and 10, each segment connector 26 extends at a distance from the joining plane P, the distance between the joining plane P and the segment connector 26 being strictly greater than the height of a reinforcement 60.

In these variants, a reinforcement 60 is placed, in the longitudinal direction, between two segment connectors 26 that are adjacent in the longitudinal direction on either side of the junction plane P.

In these variants, the reinforcement 60 is spaced longitudinally from the adjacent segment 26 connector. For example, the distance in the longitudinal direction between the reinforcement 60 and each longitudinally adjacent segment 26 connector is greater than or equal to the height of the reinforcement 60.

Preferably, the width of reinforcement 60 is greater than or equal to the width of the adjacent segment connectors 26. It is preferably less than or equal to the width of the wall facet of mast section 1 to which it is attached, taken at the junction plane P between these two mast elements 14.

In the variant shown in FIG. 9, the width of the reinforcement 60 is strictly greater than the width of the adjacent segment connector 26.

For example, it is greater than or equal to 70% of the width of the wall facet of the mast section 1 to which the reinforcement 60 is attached, taken at the junction plane P between these two mast elements 14, and in particular to 85% of this width. In the embodiment shown in FIG. 9, the width of reinforcement 60 is approximately equal to the width of the wall facet of the mast section 1 to which it is attached.

In the variant shown in FIG. 9, the mast section 1 also includes intermediate reinforcements 64 arranged on the same surface of the mast section 1 as the reinforcements 60, extending across two adjacent mast elements 14 between the two adjacent reinforcements 60.

The intermediate braces 64 connect the mast elements 14 to each other at the center panels 18 of their wall segments 16. They extend across the two adjacent mast elements 14 by being attached to the center panels 18 of the wall segments 16 of these mast elements 14.

The intermediate reinforcements 64 have the same geometry as the reinforcements 60.

If the mast section 1 includes intermediate connectors 37, each intermediate reinforcement 64 extends radially opposite an intermediate connector 37.

The mast section 1 in the variant shown in FIG. 10 differs from the mast section 1 in the variant shown in FIG. 9 in that the width of the reinforcement 60 is approximately equal to the width of the adjacent segment connector(s) 26 in the longitudinal direction.

According to this variant, the width of the reinforcement 60 is strictly less than the width of the wall facet of the mast section 1 to which it is attached, taken at the level of the junction plane P between these two mast elements 14.

As shown in FIG. 10, in this embodiment, the longitudinal edges 66 of the reinforcement 60 extend in the longitudinal extension of the longitudinal edges 68 of the longitudinally adjacent segment connector(s) 26.

As an option, the mast section 1 according to the variant shown in FIG. 10 additionally includes intermediate reinforcements 64 as described in relation to the embodiment in FIG. 9.

Figure 11:
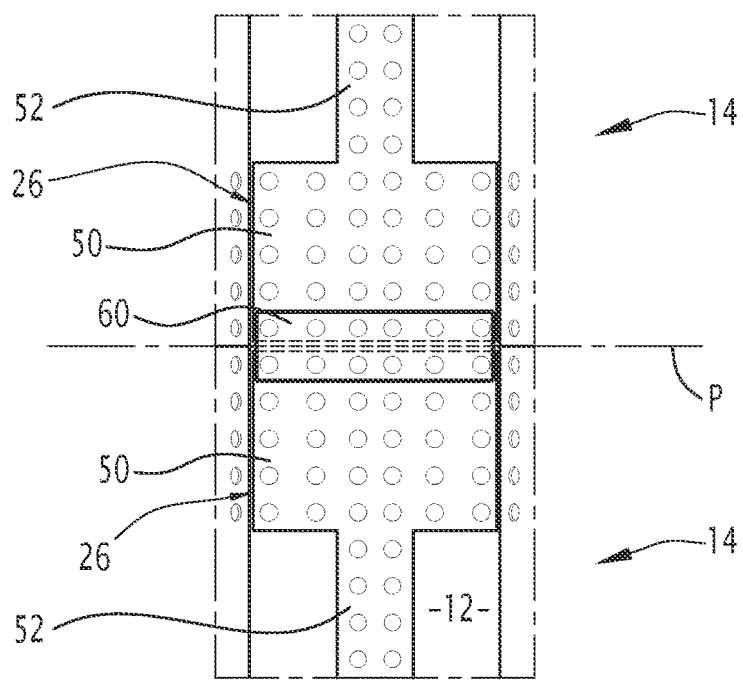

The mast section 1 according to the variant shown in FIG. 11 differs from the mast section 1 described in FIGS. 1 to 6 only in that it comprises the segment connectors 26 as described in FIG. 8 in combination with the reinforcements 60 as described in FIG. 9.

In this embodiment, each segment connector 26 extends to the junction plane P between adjacent mast elements 14 and the reinforcements 60 extend across the or each adjacent segment connector 26 for at least part of the height of these segment connectors 26.

In this embodiment, each reinforcement 60 is supported on the corresponding surface of the mast section 1, that is, in the example shown, on the inner surface 12 of the mast section 1, by the segment connector 26.

In this embodiment, each reinforcement 60 extends only over the first part 50 of the corresponding segment connector 26. In the embodiment shown, each reinforcement 60 extends in the longitudinal direction over only part of the height of the first part 50 of the corresponding segment connector 26.

In the variant shown in FIG. 11, each reinforcement 60 has a width approximately equal to the width of this first part 50 of the corresponding segment connector 26.

Figure 12:
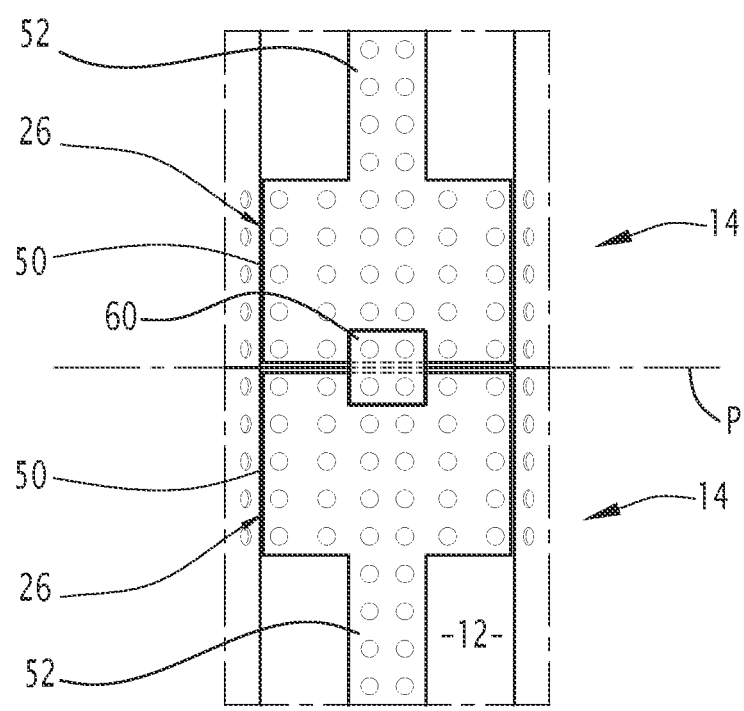

The mast section 1 in the variant shown in FIG. 12 differs from the mast section 1 described opposite FIG. 11 only by the width of the reinforcement 60.

The reinforcement 60 in this variant is identical to the one described in FIG. 8.

However, the width of the reinforcement 60 in this variant is strictly less than the width of the adjacent segment connectors 26 in the longitudinal direction.

As an option, the mast section 1 according to the variant shown in FIGS. 11 and 12 additionally includes intermediate reinforcements 64 as described in relation to the construction method in FIG. 9.

The mast section 1 in the variants shown in FIGS. 7 to 12 has the same advantages as the mast section 1 described in FIGS. 1 to 6, but with an even higher mechanical strength due to the geometry of the segment connectors 26 and the possible presence of reinforcements 60 and intermediate reinforcements 64.

The method for joining the mast sections 1 according to the variants in FIGS. 9 and 12 differs from the method described in FIGS. 1 to 6 only in that the step of joining the mast elements 14 to each other also includes the joining of the mast elements 14 via reinforcements 60, and optionally the intermediate reinforcements 64.

As described above, these reinforcements 60, 64 can be pre-assembled on the corresponding wall segments 16.

A mast section 1 according to a variant of the embodiment shown in FIGS. 1 to 12 differs from the mast section 1 shown in FIGS. 1 to 12 only in that the longitudinally adjacent mast elements 14 are angularly offset with respect to each other so that the longitudinal edges of a wall segment 16 of the upper mast element 14 are not in continuation of the longitudinal edges of the longitudinally adjacent wall segment 16 of the lower mast element 14. In other words, the joining lines between circumferentially adjacent wall segments 16 of the upper mast element 14 are angularly offset from the joining lines between circumferentially adjacent wall segments 16 of the lower mast element 14. They do not extend in the longitudinal direction of each other.

According to this variant, at least one center panel 18 of a wall segment 16 of the upper the mast element 14 extends in the longitudinal direction opposite to two adjacent side panels 20 of the lower the mast element 14.

Thus, the segment connectors 26 of the upper mast element 14 are angularly offset in relation to the segment connectors 26 of the lower mast element 14. They do not extend in line with each other.

In this variant, due to the angular offset between the adjacent mast elements 14, each section connector 36 extends opposite only one segment connector 26. In addition, each element connector 36 extends across three wall segments 16, instead of four as in the previous embodiment.

The assembly method of the mast section 1 in this variant is similar to that described above, the only difference being that the mast elements 14 are stacked in such a way that there is an angular offset between the adjacent mast elements 14.

The mast section 1 in this variant has the same advantages as described above.

In addition, the angular offset of the mast elements 14 improves the mechanical strength of the mast section 1 and the mast 2, since the connecting lines between wall segments 16 of the adjacent mast elements 14, which are represented by the segment connectors 26, are not arranged opposite each other in the longitudinal direction. In effect, the mechanically weaker areas are thus better distributed along the circumference of the mast section 1, which further improves the mechanical strength of the wind turbine mast 2.

In the embodiment described in FIGS. 1 to 12, the segment connectors 26, as well as, in the case of the embodiment described in FIGS. 9 to 12, the reinforcements 60 and/or the intermediate reinforcements 64, are arranged on the inner surface 12 of the mast section 1, while the element connectors 36 and the optional intermediate connectors 37 are arranged on the outer surface 13 of the mast section 1. The mast section 1 in the variants differs from this mast section from the embodiments of FIGS. 1 to 12 only in that the segment connectors 26, as well as the reinforcements 60 and/or the intermediate reinforcements 64 in the case of the embodiment of FIGS. 9 to 12, are arranged on the outer surface 13 of the mast section 1, while the element connectors 36 and the optional intermediate connectors 37 are arranged on the inner surface 12 of the mast section 1.

The mast section 1 in this variant has the same advantages as those described above with respect to the embodiment of FIGS. 1 to 6.

In addition, the assembly method differs from the method described above only in the faces of the wall segments 16, to which the segment connectors 26, element connectors 36, and any intermediate connectors 37, reinforcements 60 and intermediate reinforcements 64 are attached.

What is claimed is:

1. A mast section for a wind turbine having a longitudinal center axis extending in a longitudinal direction and comprising a wall having an inner surface and an outer surface, the mast section comprising:
    at least two tubular mast elements stacked in the longitudinal direction and arranged edge to edge at a joining plane, each tubular mast element comprising at least two wall segments, connected to each other by segment connectors extending along longitudinal edges of the wall segments,
    element connectors each extending across the at least two tubular mast elements and connecting the tubular mast elements to each other,
    the element connectors being arranged on one of the inner surface and the outer surface of the wall of the mast section and the segment connectors being arranged on the other of the inner surface and the outer surface of the wall of the mast section and each element connector extending at least partly opposite at least one of the segment connectors in a radial direction of the mast section so that the each element connector and the opposite at least one segment connector at least partly overlap over an overlapping height.

2. The mast section according to claim 1, wherein the element connectors are arranged on the outer surface of the mast section and the segment connectors are arranged on the inner surface of the mast section.

3. The mast section according to claim 1, wherein each element connector extends partially opposite at least two of the segment connectors adjacent in the longitudinal direction, one of the at least two segment connectors being arranged above the joining plane between the two tubular mast elements and another of the at least two segment connectors being arranged below the joining plane.

4. The mast section according to claim 1, wherein the overlapping height is of not more than 20% of a height of the tubular mast element on which the segment connector is arranged.

5. The mast section according to claim 1, wherein each element connector extends radially opposite a corresponding one of the segment connectors in an overlap area extending over a single one of the tubular mast elements.

6. The mast section according to claim 1, wherein each segment connector and/or each element connector is in the form of a flat plate.

7. The mast section according to claim 1, wherein, for at least one of the tubular mast elements, the tubular mast element comprises at least two of the segment connectors adjacent in the longitudinal direction at each junction between two of the wall segments that are circumferentially adjacent.

8. The mast section according to claim 1, wherein each segment connector has a constant width along a height of the mast section.

9. The mast section according to claim 1, wherein each segment connector has a first part, extending radially opposite a corresponding one of the element connectors, and a second part, which does not extend radially opposite a corresponding one of the element connectors, a width of the first part being strictly greater than the width of the second part.

10. The mast section according to claim 1, wherein each segment connector extends up to a junction plane between the tubular mast elements that are adjacent.

11. The mast section according to claim 1, wherein each segment connector extends at a distance from the joining plane between the tubular mast elements that are adjacent.

12. The mast section according to claim 1, further comprising reinforcements, each reinforcement being arranged on a same one of the inner surface or outer surface of the mast section as the segment connectors and extending across the two tubular mast elements that are adjacent, each element connector being arranged opposite one of the reinforcements in the radial direction.

13. The mast section according to claim 12, wherein each reinforcement is elongated in a direction perpendicular to the longitudinal direction.

14. The mast section according to claim 12, wherein each reinforcement extends in a longitudinal extension of one of the segment connectors.

15. The mast section according to claim 12, wherein each reinforcement overlaps at least one of the segment connectors.

16. The mast section according to claim 12, wherein each reinforcement has a width greater than or equal to a width of the segment connector.

17. The mast section according to claim 1, wherein each wall segment comprises at least one center panel and two side panels forming an angle with the or each center panel, the side panels comprising the longitudinal edges of the wall segment.

18. The mast section according to claim 17, further comprising intermediate connectors, arranged extending across two of the tubular mast elements that are adjacent, between two of the element connectors that are circumferentially adjacent, the intermediate connectors being arranged on a same one of the inner surface and the outer surface of the mast section as the element connectors.

19. The mast section according to claim 18, wherein each intermediate connector extends across two of the center panels, which are longitudinally adjacent, of the two tubular mast elements and each segment connector extends across two of the side panels, which are circumferentially adjacent, of at least one of the two tubular mast elements that are adjacent.

20. The mast section according to claim 17, wherein the tubular mast elements include an upper tubular mast element and a lower tubular mast element, the longitudinal edges of one of the wall segment of the upper tubular mast element lie in an extension of the longitudinal edges of the adjacent wall segment in the longitudinal direction of the lower tubular mast element.

21. The mast section according to claim 20, wherein each segment connector extends across two of the side panels, which are circumferentially adjacent, of the two of the tubular mast elements that are adjacent.

22. The mast section according to claim 1, wherein the adjacent ones of the tubular mast elements are angularly offset with respect to each other.

23. The mast section according to claim 22, wherein each element connector extends across two circumferentially adjacent side panels of one of the tubular mast elements and over a center panel of another of the tubular mast elements.

24. The mast section according to claim 1, wherein the mast section has a tubular shape of polygonal cross-section, each side of the polygonal cross-section defining one facet of the mast section.

25. The mast section according to claim 15, wherein each reinforcement extends across two of the segment connectors that are longitudinally adjacent.

26. A wind turbine mast comprising:
at least one of the mast sections according to claim 1.

27. A method for assembling the mast section according to claim 1, comprising:
providing the wall segments and assembling the wall segments to each other via the segment connectors so as to form the at least two tubular mast elements; and
stacking the at least two tubular mast elements in the longitudinal direction, and connecting the two tubular mast elements to each other by the element connectors.

* * * * *